United States Patent
Endo et al.

(10) Patent No.: US 8,712,016 B2
(45) Date of Patent: Apr. 29, 2014

(54) THREE-DIMENSIONAL SHAPE DATA PROCESSING APPARATUS AND THREE-DIMENSIONAL SHAPE DATA PROCESSING METHOD

(75) Inventors: Takaaki Endo, Urayasu (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 736 days.

(21) Appl. No.: 12/640,285

(22) Filed: Dec. 17, 2009

(65) Prior Publication Data
US 2010/0166280 A1    Jul. 1, 2010

(30) Foreign Application Priority Data

Dec. 26, 2008 (JP) .................................. 2008-334265

(51) Int. Cl.
*G06K 9/00* (2006.01)
(52) U.S. Cl.
USPC .............................................. 378/131; 378/4
(58) Field of Classification Search
USPC .................................. 382/131; 378/21, 4–20
See application file for complete search history.

(56) References Cited

U.S. PATENT DOCUMENTS

| | | | | |
|---|---|---|---|---|
| 5,633,951 A | * | 5/1997 | Moshfeghi | ..................... 382/154 |
| 5,647,360 A | * | 7/1997 | Bani-Hashemi et al. | ..... 600/425 |
| 5,937,083 A | * | 8/1999 | Ostuni | .......................... 382/131 |
| 6,154,518 A | * | 11/2000 | Gupta | .............................. 378/62 |
| 6,226,418 B1 | * | 5/2001 | Miller et al. | ................... 382/294 |
| 2001/0036303 A1 | * | 11/2001 | Maurincomme et al. | ..... 382/132 |
| 2003/0055307 A1 | * | 3/2003 | Elmaleh et al. | ..................... 600/1 |
| 2004/0264778 A1 | * | 12/2004 | Liang et al. | ................... 382/203 |
| 2005/0111710 A1 | * | 5/2005 | Gritzky et al. | ................ 382/128 |
| 2006/0052686 A1 | * | 3/2006 | Zhang et al. | ................... 600/407 |
| 2007/0189591 A1 | * | 8/2007 | Lu et al. | ......................... 382/128 |
| 2010/0080435 A1 | * | 4/2010 | Gundel | ......................... 382/131 |

FOREIGN PATENT DOCUMENTS

| | | |
|---|---|---|
| JP | 06-259533 A | 9/1994 |
| JP | 2000-207574 A | 7/2000 |

* cited by examiner

*Primary Examiner* — Hoon Song
(74) *Attorney, Agent, or Firm* — Canon USA, Inc., IP Division

(57) ABSTRACT

A three-dimensional shape data processing apparatus includes a data input unit configured to input data of a first tomographic image group including a plurality of tomographic images and data of a second tomographic image group including a plurality of tomographic images, wherein at least a part of an image capturing area of the second tomographic image group is overlapped with at least a part of an image taking area of the first tomographic image groups, and a combination unit configured to combine first three-dimensional shape data and second three-dimensional shape data into one piece of three-dimensional shape data according to an estimated accuracy estimated values of the first and second three-dimensional shape data at a plurality of positions.

15 Claims, 9 Drawing Sheets

THREE-DIMENSIONAL SHAPE DATA PROCESSING APPARATUS AND THREE-DIMENSIONAL SHAPE DATA PROCESSING METHOD

BACKGROUND OF THE INVENTION

1. Field of the Invention

The present invention relates to a three-dimensional shape data processing apparatus and a three-dimensional shape data processing method configured to process three-dimensional shape data.

2. Description of the Related Art

During a medical examination, a doctor observes the state and the change with time of a lesion of a subject by reading an X-ray medical image displayed on a monitor, which is captured by imaging the lesion of a subject (object). In a medical examination, a tomographic image of the inside of a subject is often used as the medical image. A tomographic image is captured by using a modality.

As a modality, an apparatus, such as an optical coherence tomography (OCT), an ultrasonic image diagnostic apparatus, a magnetic resonance imaging apparatus (MRI), or an X-ray computed tomographic imaging apparatus (an X-ray computed tomography (CT)), is used.

However, it is difficult for a doctor to recognize the three-dimensional shape and the dimension or magnitude of a lesion only by observing each tomographic image captured by the above-described modality. In order to address the problem like this, a conventional method restores three-dimensional shape data based on a plurality of tomographic images. By observing a three-dimensional tomographic image generated based on restored three-dimensional shape data, it becomes easy for a doctor to recognize the three-dimensional shape and the dimension or the magnitude of a lesion by executing analysis by looking closely at the displayed image.

The above-described modality, such as an OCT, MRI, or X-ray CT captures a group of tomographic images (i.e., a plurality of tomographic images) of a lesion at regular positional intervals. Accordingly, by simply displaying the tomographic images in a mutually superposed manner, three-dimensional shape data can be easily restored.

On the other hand, if an ultrasonic image diagnostic apparatus is used as the modality, a doctor or a medical technician usually captures a tomographic image of a lesion by freely moving a probe by hand. Therefore, in this case, information about the position of the captured tomographic image within the body of the subject is not acquired. In order to address the above-described problem, a conventional method measures the position and orientation of the probe by using an external sensor and calculates the positional relationship among captured tomographic images to restore three-dimensional shape data.

However, in this case, displacement may occur among tomographic images due to movement of the subject that may occur during capturing of the tomographic images and also due to an error in estimation of spatial positional relationship among the captured tomographic images. As a result, distortion may occur on restored three-dimensional shape data.

FIG. 9 illustrates an example of distortion that may occur on restored three-dimensional shape data in a conventional method. Referring to FIG. 9, distortion (deformation) has occurred on three-dimensional shape data of an object having a shape of a cuboid (or a cube).

A conventional method reduces distortion of three-dimensional shape data by correcting displacement among tomographic images. More specifically, a conventional method corrects displacement among tomographic images, which are acquired by radially capturing images of the fundus of the eye of a subject by using an OCT. The conventional method uses one reference tomographic image of a range of a lesion in a cylinder-like shape. In addition, the conventional method minimizes the difference between the heights of contours of a captured tomographic image and a reference tomographic image by using a genetic algorithm. Thus, the conventional method acquires highly accurate data of the shape of the fundus.

Another conventional method corrects displacement among tomographic images captured by an ultrasonic image diagnostic apparatus by using one reference tomographic image, which is captured in a direction perpendicular to the direction of capturing the tomographic images. This conventional method corrects displacement among ultrasonic tomographic images by aligning a captured tomographic image and the reference tomographic image based on a result of comparison of pixel values of the captured tomographic image and the reference tomographic image on an intersection thereof.

Yet another conventional method improves the quality of a tomographic image by combining a plurality of pieces of three-dimensional shape data. More specifically, Japanese Patent Application Laid-Open No. 06-259533 discusses a method for combining and acquiring highly accurate three-dimensional shape data based on a plurality of sectional images of a subject, which is captured in a plurality of directions while at different in-focus positions of a microscope. This conventional method addresses such a problem that the characteristic of spatial frequency in the direction of an optical axis is lower than that in the direction within the image plane by combining sectional images acquired in different optical axis directions.

In addition, Japanese Patent Application Laid-Open No. 2000-207574 discusses the following method. The conventional method acquires a plurality of pieces of volume data by scanning a subject in a plurality of different directions and generates surface data based on the plurality of pieces of volume data. Furthermore, the conventional method deforms and combines the plurality of pieces of surface data. The conventional method also addresses such a problem that the characteristic of spatial frequency in the direction of scanning is lower than that in the direction within the image plane by complementarily using data obtained in different scanning directions.

However, if distortion has occurred on a reference image itself due to movement of a subject during capturing of the reference image, any of the above-described conventional methods cannot correct the distortion on the reference image. Furthermore, each of the above-described conventional methods is directed only to correct displacement among tomographic images. Accordingly, each of the above-described conventional methods does not satisfy a desire by the market for improving the image quality of three-dimensional shape data.

In addition, in each of the above-described conventional method, it is assumed that a subject remains stationary. Accordingly, if a subject moves during an image capturing operation, each of the above-described conventional methods cannot acquire three-dimensional shape data of a sufficient image quality. Furthermore, if distortion has occurred on three-dimensional shape data due to movement of a subject during processing for acquiring each three-dimensional shape data, each of the above-described conventional methods cannot correct the distortion on the three-dimensional shape data.

SUMMARY OF THE INVENTION

The present invention is directed to a three-dimensional shape data processing apparatus and a three-dimensional shape data processing method configured to restore high-quality three-dimensional shape data on which little distortion may occur.

According to an aspect of the present invention, a three-dimensional shape data processing apparatus includes a data input unit configured to input data of a first tomographic image group including a plurality of tomographic images and data of a second tomographic image group including a plurality of tomographic images, wherein at least a part of an image capturing area of the second tomographic image group is overlapped with at least a part of an image capturing area of the first tomographic image group. The three-dimensional shape data processing apparatus further includes a restoration unit configured to restore first three-dimensional shape data based on the first tomographic image group and second three-dimensional shape data based on the second tomographic image group, an estimation unit configured to estimate an accuracy value of the first and second three-dimensional shape data at a plurality of positions, and a combination unit configured to combine the first and second three-dimensional shape data into one piece of three-dimensional shape data based on the estimated accuracy values of the first and second three-dimensional shape data estimated by the estimation unit at the plurality of positions.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the invention.

DESCRIPTION OF THE EMBODIMENTS

Various exemplary embodiments, features, and aspects of the invention will be described in detail below with reference to the drawings.

Now, a first exemplary embodiment of the present invention will be described in detail below. A three-dimensional shape data processing apparatus (a three-dimensional shape data restoration apparatus) according to the present exemplary embodiment restores three-dimensional shape data based on volume data including luminance value stored in each voxel constituting a three-dimensional voxel mesh. Hereinbelow, "volume data including luminance value stored in each voxel constituting a three-dimensional voxel mesh" will be simply referred to as "luminance value arrangement data".

In the present exemplary embodiment, two pieces of luminance value arrangement data is input. The two luminance value arrangement data is combined together based on information about association of characteristic points in the luminance value arrangement data. Thus, the present exemplary embodiment generates one piece of luminance value arrangement data. Now, the three-dimensional shape data processing apparatus and a three-dimensional shape data processing method according to the present exemplary embodiment will be described in detail below.

Figure 1:
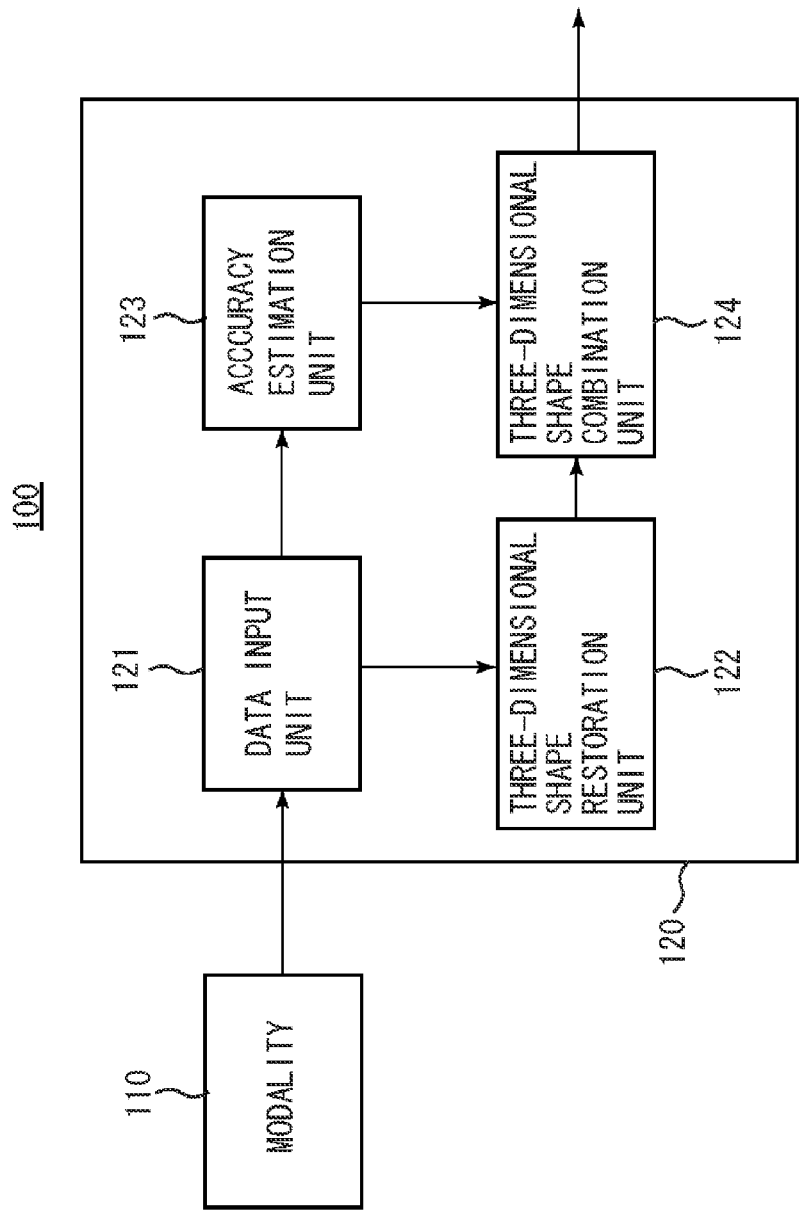
FIG. 1 is a block diagram illustrating an exemplary configuration of a three-dimensional shape data restoration system according to a first exemplary embodiment of the present invention.

FIG. 1 is a block diagram illustrating an exemplary configuration of a three-dimensional shape data restoration system 100 according to the present exemplary embodiment. Referring to FIG. 1, the three-dimensional shape data restoration system 100 includes a modality 110 and a three-dimensional shape data processing apparatus 120.

The modality 110 includes an OCT, which captures a medical image such as a tomographic image of the fundus. The modality 110 according to the present exemplary embodiment acquires two tomographic image groups by shooting a plurality of tomographic images of a subject (object) twice.

More specifically, in the present exemplary embodiment, a plurality of tomographic images acquired by one shooting operation is included in a tomographic image group defined as a "first tomographic image group" while a plurality of tomographic images acquired by two shooting operations is included in a tomographic image group defined as a "second tomographic image group". In the present exemplary embodiment, the modality 110 captures tomographic images so that the direction of the normal line to at least a part of the tomographic images included in the first tomographic image group differs from the direction of the normal line to at least a part of the tomographic images included in the second tomographic image group by approximately 90 degrees.

The three-dimensional shape data processing apparatus 120 is connected to the modality 110 and can execute data communication with the modality 110. The three-dimensional shape data processing apparatus 120 includes functional components, such as a data input unit 121, a three-dimensional shape restoration unit 122, an accuracy estimation unit 123, and a three-dimensional shape combination unit 124.

The data input unit 121 inputs the data of two tomographic image groups acquired by the modality 110 (the first tomographic image group and the second tomographic image group) into the three-dimensional shape data processing apparatus 120. More specifically, the data input unit 121 inputs data of the first tomographic image group, which includes a plurality of tomographic images, and data of the second tomographic image group, which includes a plurality of tomographic images whose imaging area is overlapped with that of at least a part of the tomographic images included in the first tomographic image group.

In the present exemplary embodiment, the first tomographic image group includes $N_1$ ($N_1$ is an integer) tomographic images while the second tomographic image group includes $N_2$ ($N_2$ is an integer) tomographic images. In addition, in the present exemplary embodiment, the modality 110 captures an image of the macula (yellow spot) of the fundus including the fovea as a subject (object).

Furthermore, the data input unit 121 executes processing for inputting data of the position and orientation of an image capturing unit (not illustrated) of the modality 110 and data of the shooting date and time, which is output by the modality 110, into the three-dimensional shape data processing apparatus 120.

In the present exemplary embodiment, as the position and orientation of the image capturing unit, the position and orientation thereof in a reference coordinate system are used. The reference coordinate system refers to a coordinate system in which one point in an image capturing space is defined as the origin and three axes (X-, Y-, and Z-axes), which are perpendicular to one another, are taken. It is also useful if an operator of the modality 110 inputs data of the position and orientation of the image capturing unit and data of the shooting date and time by using a keyboard (not illustrated) or a mouse (not illustrated).

The data input unit 121 converts each of the two tomographic image groups output by the modality 110 (the first tomographic image group and the second tomographic image group) into digital data when necessary and outputs the converted digital data to the three-dimensional shape restoration unit 122.

In addition, the data input unit 121 calculates the position and orientation of each tomographic image in the reference coordinate system according to the data of the position and orientation of the image capturing unit output by the modality 110 and data of the position and orientation of the tomographic image in an image capturing unit coordinate system, which is previously calculated and stored.

Furthermore, the data input unit 121 outputs the data of the position and orientation of each calculated tomographic image in the reference coordinate system calculated in the above-described manner to the three-dimensional shape restoration unit 122 and the accuracy estimation unit 123. In the present exemplary embodiment, the "image capturing unit coordinate system" refers to a coordinate system in which on point on the image capturing unit is defined as the origin and three axes (X-, Y-, and Z-axes), which are perpendicular to one another, are taken.

In addition, the data input unit 121 calculates data of the shooting date and time of each pixel of each tomographic image based on the data of the shooting date and time of each tomographic image output by the modality 110 and outputs the calculated data of the shooting date and time of each pixel of each tomographic image to the accuracy estimation unit 123.

The three-dimensional shape restoration unit 122 inputs the data of each tomographic image group output by the data input unit 121 and the data of the position and orientation of each tomographic image in the reference coordinate system. Furthermore, the three-dimensional shape restoration unit 122 restores two pieces of three-dimensional shape data based on the above-described input data (more specifically, in the present exemplary embodiment, two pieces of luminance value arrangement data) and outputs each of the restored luminance value arrangement data to the three-dimensional shape combination unit 124.

The accuracy estimation unit 123 estimates the accuracy of a plurality of positions of each three-dimensional shape data based on the difference in the shooting date and time between adjacent pixels of each tomographic image and/or a measurement error of the position and orientation of each tomographic image.

More specifically, in the present exemplary embodiment, the accuracy estimation unit 123 receives the data of the position and orientation of each tomographic image in the reference coordinate system and the data of the shooting date and time of each pixel of each tomographic image, which is output by the data input unit 121.

Furthermore, the accuracy estimation unit 123 estimates the accuracy of two pieces of luminance value arrangement data restored by the three-dimensional shape restoration unit 122 for each voxel in each of the three axes based on the above-described input data.

In addition, the accuracy estimation unit 123 outputs, to the three-dimensional shape combination unit 124, two pieces of arrangement data (hereinafter simply referred to as "accuracy arrangement data"), whose accuracy estimated value in each of the three axes is stored in each voxel.

The three-dimensional shape combination unit 124 inputs two pieces of luminance value arrangement data, which are output by the three-dimensional shape restoration unit 122, and two pieces of accuracy arrangement data, which are output by the accuracy estimation unit 123. In addition, the three-dimensional shape combination unit 124 combines the two pieces of luminance value arrangement data into one piece of luminance value arrangement data based on the above-described input data and outputs the combined luminance value arrangement data.

At least one of the data input unit 121, the three-dimensional shape restoration unit 122, the accuracy estimation unit 123, and the three-dimensional shape combination unit 124 illustrated in FIG. 1 may be implemented as a separate independent apparatus. Alternatively, the units 121 through 124 may be installed on one computer or on a plurality of computers as software and a central processing unit (CPU) of the computer(s) may execute the software to implement the functions thereof.

In the present exemplary embodiment, it is supposed that each component (the data input unit 121, the three-dimensional shape restoration unit 122, the accuracy estimation unit 123, and the three-dimensional shape combination unit 124) is implemented by software and the software is installed on one computer.

Figure 2:
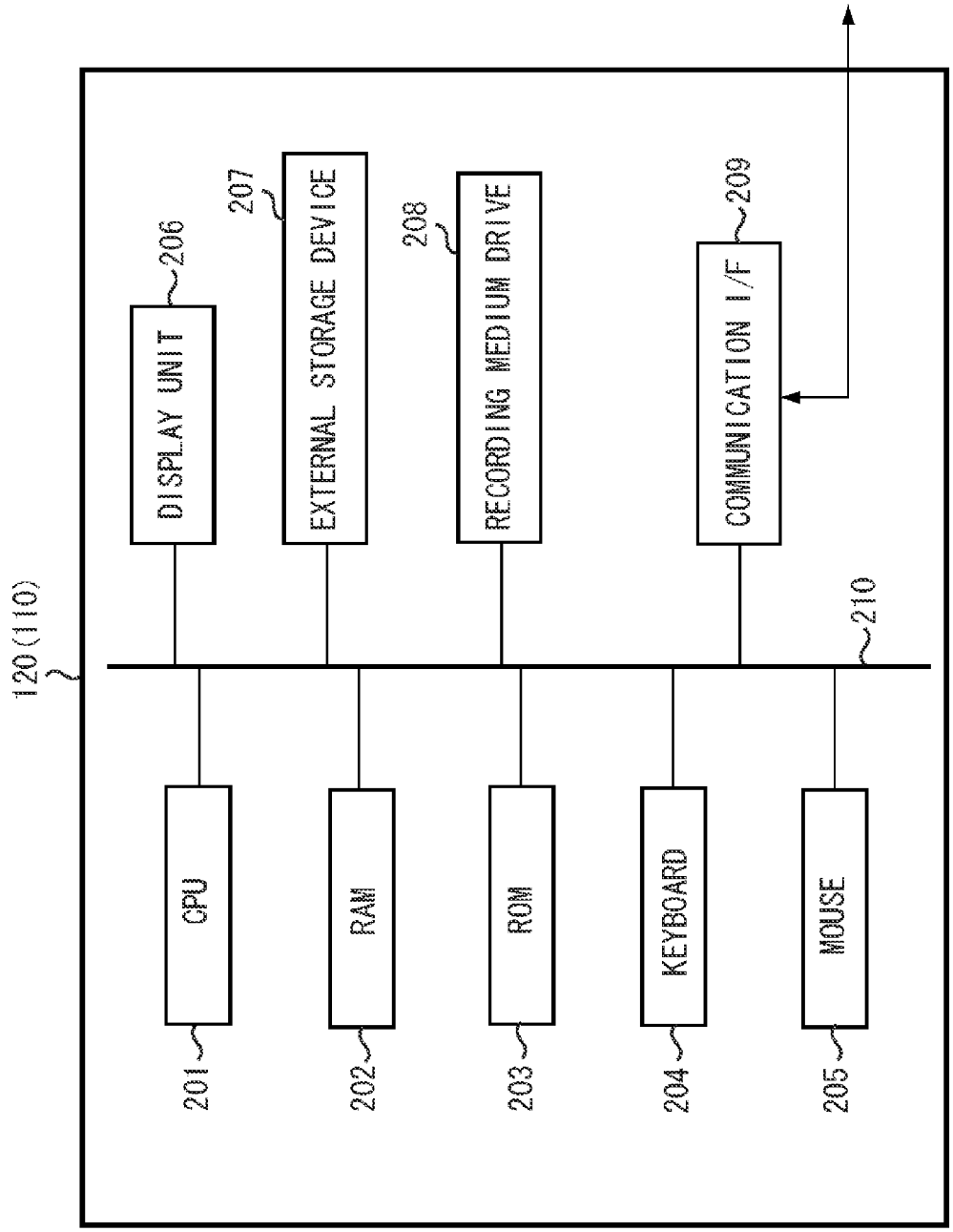
FIG. 2 is a block diagram illustrating an exemplary hardware configuration of the three-dimensional shape data processing apparatus illustrated in FIG. 1.

FIG. 2 is a block diagram illustrating an exemplary hardware configuration of the three-dimensional shape data processing apparatus 120 illustrated in FIG. 1. In the present exemplary embodiment, the three-dimensional shape restoration unit 122 and the accuracy estimation unit 123 illustrated FIG. 1 are configured with a CPU 201, and a read-only memory (ROM) 203 or an external storage device 207 in which programs are stored, illustrated in FIG. 2.

In addition, the data input unit 121 and the three-dimensional shape combination unit 124 illustrated in FIG. 1 are configured with the CPU 201, the ROM 203 or the external storage device 207 in which programs are stored, and the communication interface (I/F) 209.

Referring in FIG. 2, the three-dimensional shape data processing apparatus 120 includes the CPU 201, a random access memory (RAM) 202, the ROM 203, a keyboard 204, a mouse 205, a display unit 206, the external storage device 207, a storage medium drive 208, the communication I/F 209, and a bus 210.

The CPU 201 controls the operation of the entire three-dimensional shape data processing apparatus 120. More specifically, the CPU 201 controls the operation of the three-dimensional shape data processing apparatus 120 by controlling hardware (the components 202 through 209), which is in communication with one another via the bus 210, by using the program and data stored on the ROM 203 or the external storage device 207.

The RAM 202 functions as a temporary storage area for temporarily storing a program and data loaded from the ROM 203 or the external storage device 207. In addition, the RAM 202 functions as a work area used by the CPU 201 to execute various processing.

The ROM 203 stores a program and setting data used by the CPU 201, which are necessary for implementing the function of each component (the components 121 through 124 illustrated in FIG. 1). In the present exemplary embodiment, the external storage device 207 may store a program used by the CPU 201, which is necessary for implementing the function of each component (the components 121 through 124 illustrated in FIG. 1).

The keyboard 204 and the mouse 205 constitute an input device. The operator of the modality 110 can input various instructions to the CPU 201 by operating the keyboard 204 and the mouse 205.

The display unit 206 includes a cathode ray tube (CRT) or a liquid crystal display (LCD). The display unit 206 displays a message to be displayed during three-dimensional shape restoration processing and a three-dimensional shape image based on three-dimensional shape data under control of the CPU 201.

The external storage device 207 functions as a mass storage device, such as a hard disk drive (HDD). The external storage device 207 stores an operating system (OS) and various data and information used by the CPU 201 in executing the program stored on the ROM 203.

As described above, the external storage device 207 may store a program used by the CPU 201, which is necessary for implementing the function of each component (the components 121 through 124 illustrated in FIG. 1). Various information and data stored on the external storage device 207 is loaded on the RAM 202 when necessary.

The storage medium drive 208 reads various information and data (and a program) stored on a storage medium, such as a compact disc-read only memory (CD-ROM) and a digital versatile disk (DVD)-read only memory (DVD-ROM) according to an instruction from the CPU 201. Furthermore, the CPU 201 outputs the read information or data to the external storage device 207.

The communication I/F 209 includes a communication port for communicating with the modality 110, such as an analog video port or a digital input/output (I/O) port (an I/O port such as Institute of Electrical and Electronic Engineers (IEEE) 1394). In addition, the communication I/F 209 includes an Ethernet® port, which is a communication port for outputting various data to an external apparatus. The various data input by the modality 110 is stored on the external storage device 207 or the RAM 202 via the communication I/F 209.

The CPU 201, the RAM 202, the ROM 203, the keyboard 204, the mouse 205, the display unit 206, the external storage device 207, the storage medium drive 208, and the communication I/F 209 can communicate with one another via the bus 210.

Figure 3:
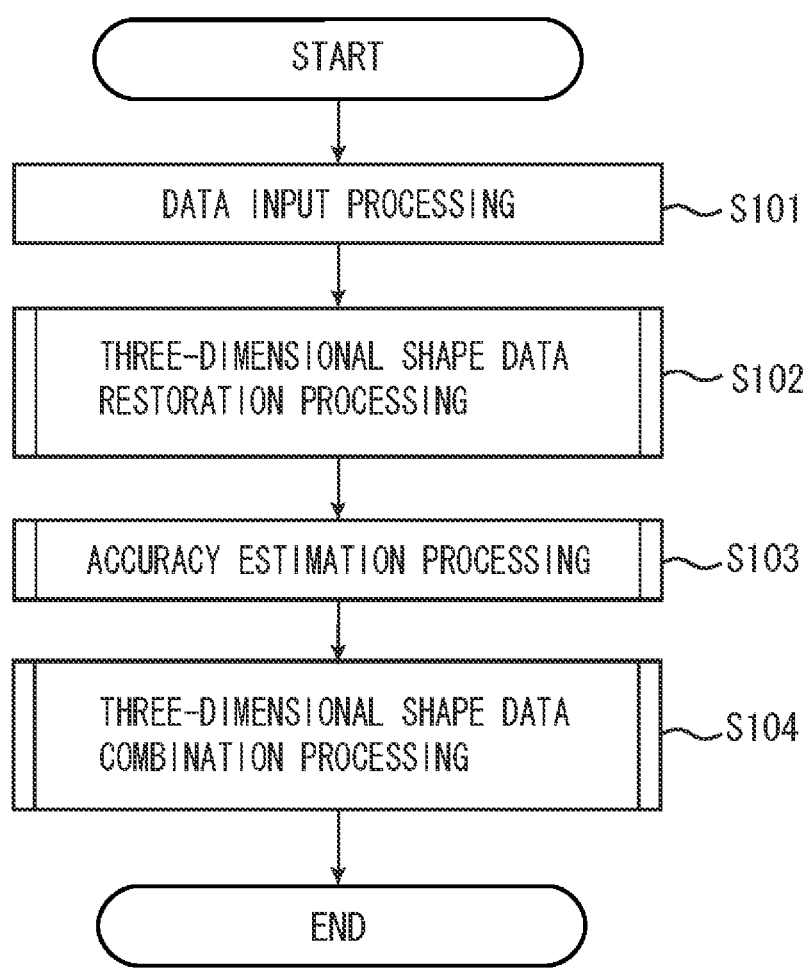
FIG. 3 is a flow chart illustrating an exemplary flow of a three-dimensional shape data processing method executed by the three-dimensional shape data processing apparatus illustrated in FIG. 1.

Now, a three-dimensional shape data processing method executed by the three-dimensional shape data processing apparatus 120 will be described in detail below. FIG. 3 is a flow chart illustrating an exemplary flow of processing of a three-dimensional shape data processing method, which is executed by the three-dimensional shape data processing apparatus 120 illustrated in FIG. 1).

Referring to FIG. 3, in step S101, the data input unit 121 inputs the data of the two tomographic image groups (the first tomographic image group and the second tomographic image group), the data of the position and orientation of the image capturing unit, and the data of the shooting date and time of each tomographic image, which is output from the modality 110.

More specifically, in step S101, the data input unit 121 calculates the position and orientation of each tomographic image in the reference coordinate system based on the data of the position and orientation of the image capturing unit. In addition, the data input unit 121 calculates data of the shooting date and time of each pixel of each tomographic image based on the data of the shooting date and time of each tomographic image.

In step S102, the three-dimensional shape restoration unit 122 executes processing for restoring two pieces of three-dimensional shape data based on the data of the two tomographic image groups and the data of the position and orientation of each tomographic image in the reference coordinate system, of the data acquired by executing the processing in step S101.

More specifically, in the present exemplary embodiment, the three-dimensional shape restoration unit 122 executes processing for restoring two pieces of luminance value arrangement data. The three-dimensional shape data restoration processing in step S102 will be described in detail below with reference to FIG. 4.

In step S103, the accuracy estimation unit 123 inputs the data of the position and orientation of each tomographic image in the reference coordinate system and the data of the shooting date and time of each pixel of each tomographic image, among the data acquired by the processing in step S101.

Furthermore, the accuracy estimation unit 123 executes processing for estimating the accuracy of two pieces of three-dimensional shape data (in the present exemplary embodiment, the luminance value arrangement data) restored by the three-dimensional shape restoration unit 122 in the three axes for each voxel, based on the above-described input data.

More specifically, in the present exemplary embodiment, the accuracy estimation unit 123 estimates the accuracy of the two tomographic image groups based on accuracy arrangement data, whose accuracy estimated value of the restored three-dimensional shape in the direction of the three axes is stored in each voxel. The accuracy estimation processing in step S103 will be described in detail below with reference to FIG. 5.

In step S104, the three-dimensional shape combination unit 124 combines two pieces of three-dimensional shape data into one piece of three-dimensional shape data based on the two pieces of three-dimensional shape data acquired in step S102 and the two pieces of accuracy arrangement data acquired in step S103.

More specifically, in the present exemplary embodiment, the three-dimensional shape combination unit 124 executes combination processing for combining two pieces of luminance value arrangement data into one piece of luminance value arrangement data. Furthermore, the three-dimensional shape combination unit 124 outputs the combined three-dimensional shape data to an external apparatus or stores the same on the RAM 202 so that the stored combined three-dimensional shape data can be utilized from the other application(s). The three-dimensional shape data combination processing in step S104 will be described in detail below with reference to FIG. 6.

The present exemplary embodiment restores luminance value arrangement data as three-dimensional shape data by executing the above-described processing insteps S101 through S104.

Figure 4:
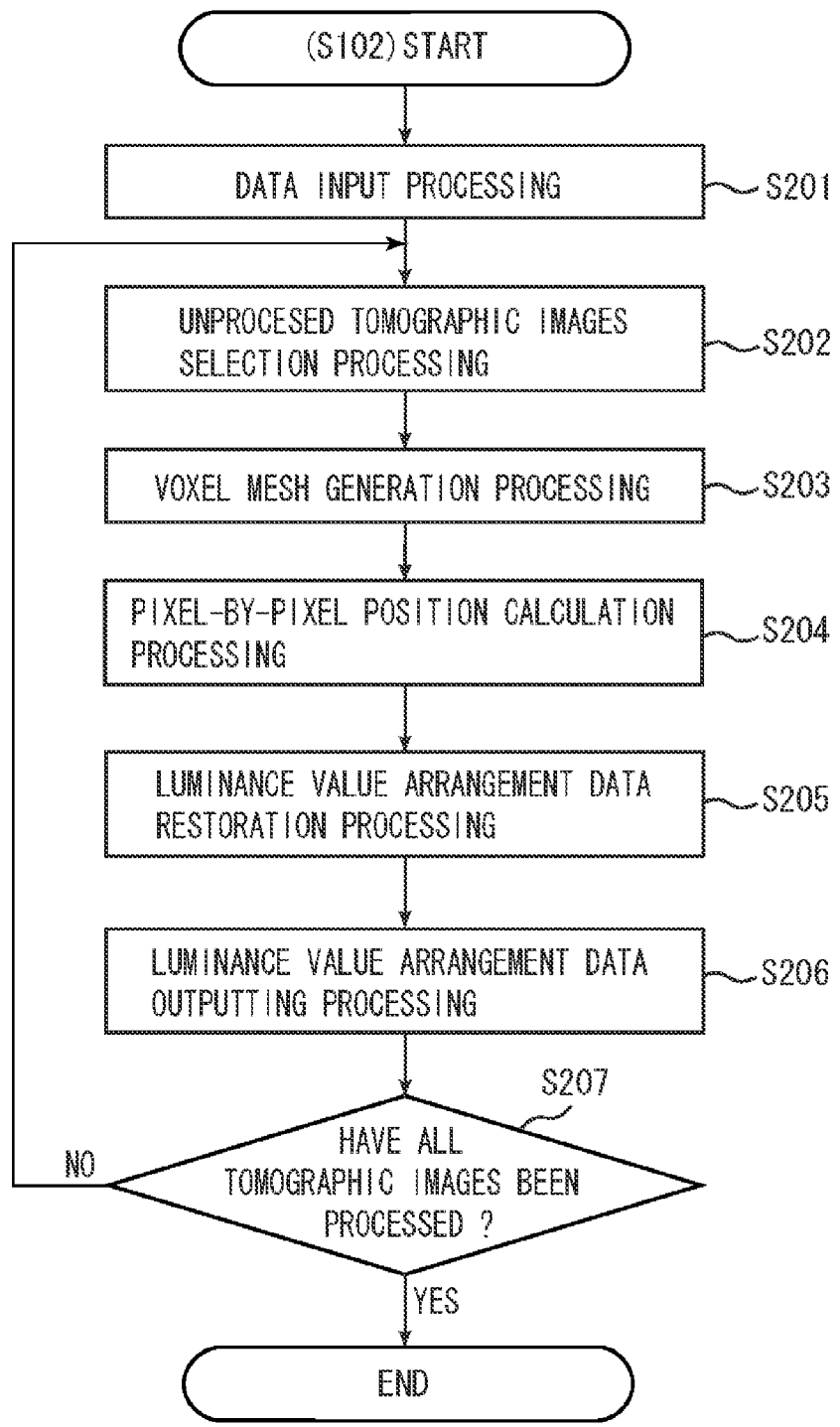
FIG. 4 is a flow chart illustrating an exemplary flow of three-dimensional shape data restoration processing in step S102 in FIG. 3.

FIG. 4 is a flow chart illustrating an exemplary flow of the three-dimensional shape data restoration processing in step S102 illustrated in FIG. 3. The processing executed in the flow chart illustrated in FIG. 4 is implemented by the CPU 201 by executing a program for implementing the function of the three-dimensional shape restoration unit 122.

It is supposed that the program code that can implement the processing in the flow chart of FIG. 4 have already been loaded from the ROM 203 or the external storage device 207 onto the RAM 202 before starting the processing illustrated in FIG. 4.

Referring to FIG. 4, in step S201, the three-dimensional shape restoration unit 122 inputs the data of two tomographic image groups and the data of the position and orientation of each tomographic image, which is included in the two tomographic image groups, in the reference coordinate system, among the data acquired by the processing in step S101, via the data input unit 121.

In step S202, the three-dimensional shape restoration unit 122 executes processing for selecting a tomographic image group that has not been processed in the processing on the two tomographic image groups, namely, the first tomographic image group and the second tomographic image group.

In step S203, the three-dimensional shape restoration unit 122 executes processing for generating a voxel mesh including 256×256×256 voxels, each of which voxel mesh storing luminance value arrangement data. In the present exemplary embodiment, the size of a voxel mesh is set at the size by which all the tomographic images can be included therein.

Furthermore, in the present exemplary embodiment, a "voxel mesh coordinate system" refers to a coordinate system in which the center of an $(N_1/2)$-th tomographic image or an $(N_2/2)$-th tomographic image is defined as the origin and three axes, which are perpendicular to one another, are taken so that they match the three axes of the reference coordinate system.

In step S204, the three-dimensional shape restoration unit 122 calculates a position of each pixel of each tomographic image in the voxel mesh coordinate system based on the data of the position and orientation of each tomographic image in the reference coordinate system input in step S201.

In step S205, the three-dimensional shape restoration unit 122 executes luminance value arrangement data restoration processing. More specifically, in step S205, the three-dimensional shape restoration unit 122 calculates a luminance value for all voxels. In the present exemplary embodiment, the luminance value for each voxel is calculated by weighted average of the luminance value for a plurality of pixels located in the vicinity of a target voxel. In this case, the reciprocal of the distance from the voxel to each pixel is used as the weight.

In step S206, the three-dimensional shape restoration unit 122 outputs the luminance value arrangement data acquired in the restoration processing in step S205 to the three-dimensional shape combination unit 124.

In step S207, the three-dimensional shape restoration unit 122 determines whether the luminance value arrangement data restoration processing have been executed on all the tomographic image groups. If it is determined that the luminance value arrangement data restoration processing have not been executed on all the tomographic image groups yet (any unprocessed tomographic image group remains) (NO in step S207), then the processing returns to step S202. In step S202, the three-dimensional shape restoration unit 122 executes the processing for selecting an unprocessed tomographic image group. Then, the three-dimensional shape restoration unit 122 executes the processing in step S203 and subsequent steps again.

More specifically, if the processing for selecting the first tomographic image group in step S202, which is the first processing of the series of three-dimensional shape data restoration processing, is completed and if the series of processing is completed, then it is determined that an unprocessed tomographic image group remains (NO in step S207). In this case, the processing returns to step S202 to execute processing for selecting the second tomographic image group.

On the other hand, if it is determined that the luminance value arrangement data restoration processing have been executed on all the tomographic image groups (no unprocessed tomographic image group remains) (YES in step S207), then the processing in the flow chart of FIG. 4 (the processing in step S102 in FIG. 3) ends.

By executing the processing in steps S201 through S207, the present exemplary embodiment restores luminance value arrangement data as three-dimensional shape data for each tomographic image group. More specifically, first luminance value arrangement data (the first three-dimensional shape data) corresponding to the first tomographic image group and second luminance value arrangement data (the second three-dimensional shape data) corresponding to the second tomographic image group is restored.

Figure 5:
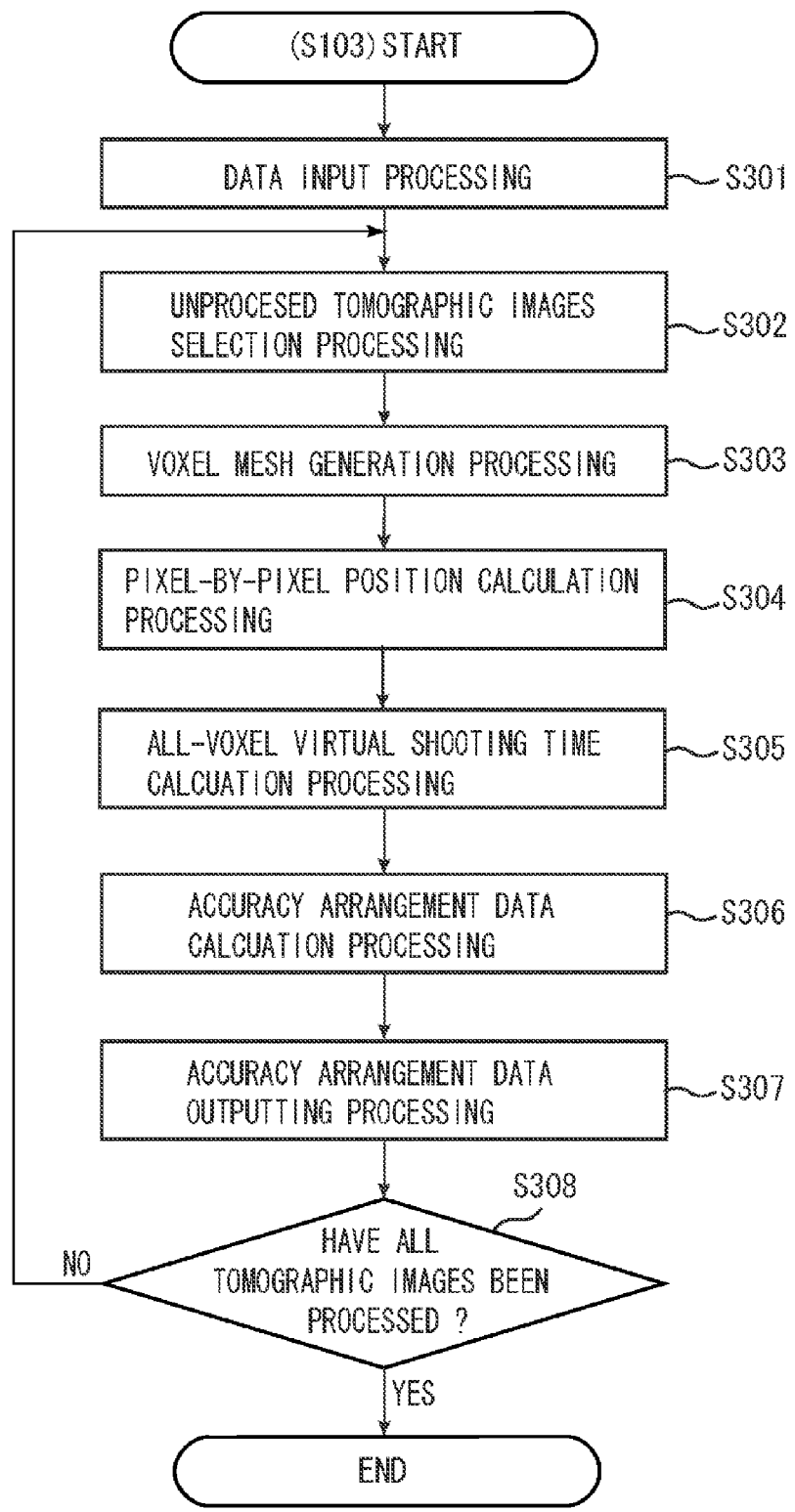
FIG. 5 is a flow chart illustrating an exemplary flow of accuracy estimation processing in step S103 in FIG. 3.

FIG. 5 is a flow chart illustrating an exemplary flow of the accuracy estimation processing in step S103 illustrated in FIG. 3. The processing in the flow chart illustrated in FIG. 5 is implemented by the CPU 201 by executing a program that can implement the function of the accuracy estimation unit 123.

It is supposed that the program code that can implement the processing in the flow chart in FIG. 5 has already been loaded from the ROM 203 or the external storage device 207 onto the RAM 202 before starting the processing illustrated in FIG. 5.

Referring to FIG. 5, in step S301, the accuracy estimation unit 123 inputs data of the position and orientation of each tomographic image in the reference coordinate system included in the two tomographic image groups and data of the shooting date and time of each pixel of each tomographic image, among the data acquired by the processing in step S101. More specifically, in the present exemplary embodiment, the data is input by the data input unit 121.

In step S302, the accuracy estimation unit 123 executes processing for selecting a tomographic image group that has not been processed in the processing on the two tomographic image groups, namely, the first tomographic image group and the second tomographic image group. In the present exemplary embodiment, in step S301, the data of the two tomographic image groups itself is not acquired by inputting. Accordingly, the accuracy estimation unit 123 selects one tomographic image group as the unit of processing based on the data of the position and orientation of each tomographic image included in the two tomographic image groups in the reference coordinate system.

In step S303, the accuracy estimation unit 123 generates a three-dimensional voxel mesh for storing accuracy arrangement data, which exists in the same coordinate system as that of a voxel mesh corresponding to the tomographic image group selected in step S302 and storing the luminance value arrangement data and having the same number of voxels and the same size as those of the voxel mesh corresponding to the tomographic image group selected in step S302.

In step S304, the accuracy estimation unit 123 calculates the position of each pixel of each tomographic image in a voxel mesh coordinate system according to the data input in step S301, which is the data of the position and orientation of each tomographic image of the tomographic image group selected in step S302 in the reference coordinate system.

In step S305, the accuracy estimation unit 123 calculates a virtual shooting date and time on all voxels based on the data input in step S301, which is the data of the shooting date and time of each pixel of each tomographic image included in the tomographic image group selected in step S302.

In the present exemplary embodiment, the virtual shooting date and time of each voxel is calculated by weighted average of the date and time of shooting a plurality of pixels located in the vicinity of a target voxel. In this case, the reciprocal of the distance from the voxel to each pixel is used as the weight.

In step S306, the accuracy estimation unit 123 calculates an estimated value of the accuracy of all voxels in the direction of three axes (X-, Y-, and Z-axes) of three-dimensional shape data to be restored.

As the difference between the values of the shooting date and time becomes greater, the probability of occurrence of displacement, which may occur due to movement of a subject (object), becomes higher. Accordingly, the present exemplary embodiment sets a smaller value of accuracy as the value of the difference Δt, which denotes the difference between a virtual shooting date and time of a target voxel and that of an adjacent voxel, becomes greater.

More specifically, the accuracy estimation unit 123 calculates and sets an estimated value of the accuracy of three-dimensional shape data by executing an operation by the following equations (1) and (2):

$$p=1-\Delta t/T \text{ (if } \Delta t<T) \quad (1)$$

$$p=0 \text{ (if } \Delta t \geq T) \quad (2).$$

In the equations (1) and (2), "T" denotes a parameter for controlling the accuracy. A predetermined known value is set for the parameter T. If T=1,000 [ms] and if Δt=100 [ms], then p=0.9. On the other hand, if Δt≥1,000 [ms], then p=0. The accuracy estimation unit 123 calculates the accuracy estimated value p in each of positive and negative directions of the three axes of the voxel mesh coordinate system. Furthermore, the accuracy estimation unit 123 calculates an average value of the accuracy estimated value p in the direction of each axis.

In step S307, the accuracy estimation unit 123 outputs the accuracy arrangement data, which is acquired in step S306 and whose accuracy estimated values in the direction of each of the three axes are stored in each voxel, to the three-dimensional shape combination unit 124.

In step S308, the accuracy estimation unit 123 determines whether the accuracy estimation processing has been executed on all the tomographic image groups. If it is determined that the accuracy estimation processing has not been executed on all the tomographic image groups yet (any unprocessed tomographic image group remains) (NO in step S308), then the processing returns to step S302. In step S302, the accuracy estimation unit 123 executes the processing for selecting an unprocessed tomographic image group. Then, the accuracy estimation unit 123 executes the processing in step S303 and subsequent steps again.

More specifically, if the processing for selecting the first tomographic image group in step S302, which is the first processing of the series of accuracy estimation processing, is completed and if the series of processing is completed, then it is determined that an unprocessed tomographic image group remains (NO in step S308). In this case, the processing returns to step S302 to execute processing for selecting the second tomographic image group.

On the other hand, if it is determined that the accuracy estimation processing has been executed on all the tomographic image groups (no unprocessed tomographic image group remains) (YES in step S308), then the processing in the flow chart in FIG. 5 (the processing in step S103 in FIG. 3) ends.

By executing the processing in steps S301 through S308, the present exemplary embodiment acquires the accuracy arrangement data whose accuracy estimated value in the direction of each of three axes is stored in each voxel for each tomographic image group.

Figure 6:
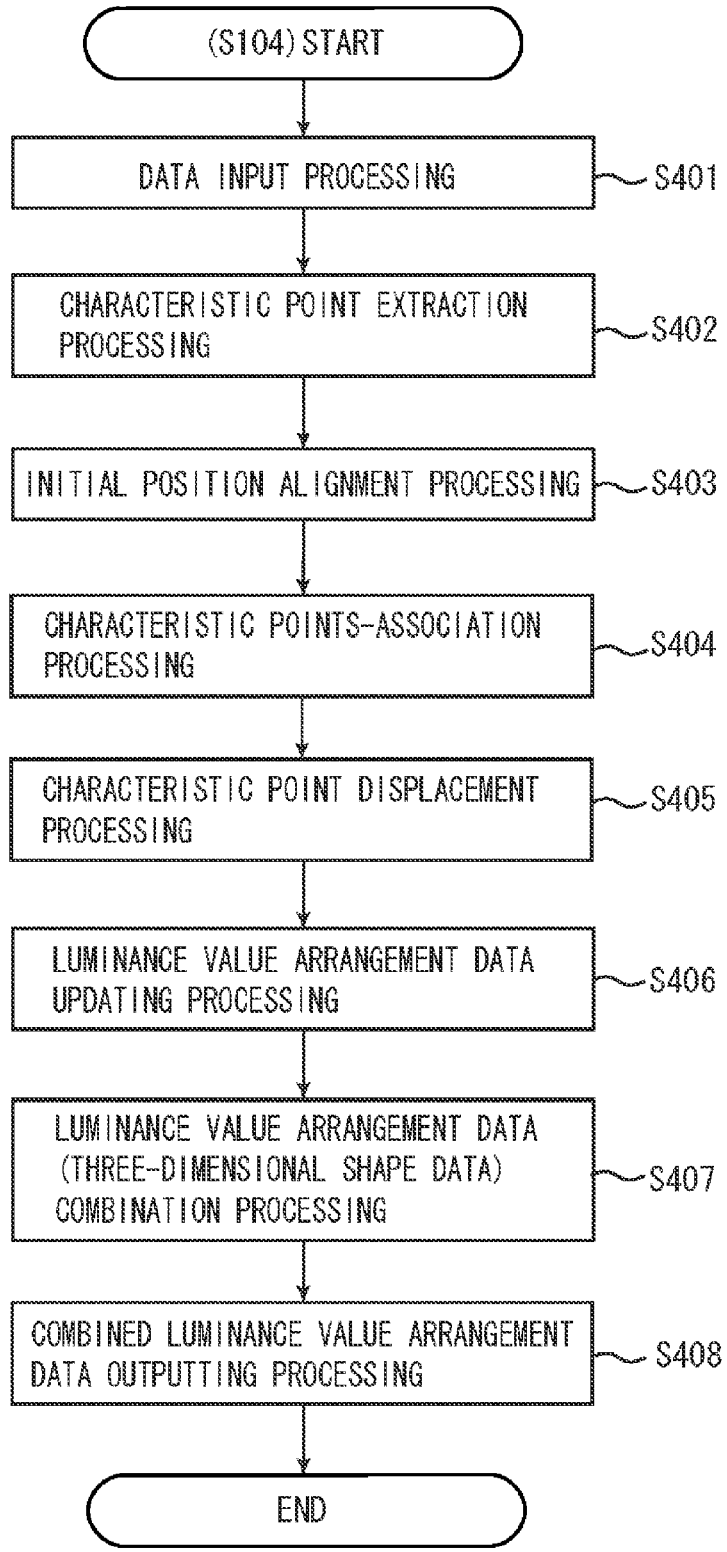
FIG. 6 is a flow chart illustrating an exemplary flow of three-dimensional shape data combination processing executed in step S105 in FIG. 3 according to the first exemplary embodiment of the present invention.

FIG. 6 is a flow chart illustrating an exemplary flow of three-dimensional shape data combination processing in step S105 in FIG. 3 according to the first exemplary embodiment. The processing in the flow chart illustrated in FIG. 6 is implemented by the CPU 201 by executing a program that can implement the function of the three-dimensional shape combination unit 124.

It is supposed that the program code that can implement the processing in the flow chart in FIG. 6 has already been loaded from the ROM 203 or the external storage device 207 onto the RAM 202 before starting the processing illustrated in FIG. 6.

Referring to FIG. 6, in step S401, the three-dimensional shape combination unit 124 inputs the data output by the three-dimensional shape restoration unit 122 and the accuracy estimation unit 123. More specifically, the three-dimensional shape combination unit 124 inputs, from the three-dimensional shape restoration unit 122, two pieces of luminance value arrangement data including luminance value stored in each voxel.

In addition, the three-dimensional shape combination unit 124 inputs, from the accuracy estimation unit 123, two pieces of accuracy arrangement data, in which accuracy estimated value in the direction of each of three axes is stored in each voxel.

In step S402, the three-dimensional shape combination unit 124 selects and extracts a plurality of characteristic points included in the two pieces of luminance value arrangement data input in step S401, namely, a characteristic point likely to be extracted during image processing and a characteristic point that may anatomically become characteristic to a subject.

In the processing in step S402, it is useful to use a two-dimensional image corner detection device, such as FAST, which is discussed in E. Rosten and T. Drummond, "Fusing points and lines for high performance tracking", In 10th IEEE International Conference on Computer Vision, vol. 2, pp.

1508-1515, 2005. In this case, the corner detection device can be expanded for use on volume data.

More specifically, at first, the three-dimensional shape combination unit 124 calculates a luminance value of a voxel existing on a sphere of a radius of 3 voxels around the target voxel. If voxels, each of whose luminance value differs from the target voxel by a value greater than a threshold value, continuously exist in an area three-fourths or larger of the entire sphere, then the three-dimensional shape combination unit 124 selects and extracts the target voxel as a characteristic point. Alternatively, a branch point of a blood vessel is automatically or manually selected by using a point anatomically characteristic to a subject as the characteristic point.

In step S403, the three-dimensional shape combination unit 124 executes initial position alignment processing. More specifically, in step S403, the three-dimensional shape combination unit 124 roughly aligns the initial position of the two pieces of luminance value arrangement data input in step S401 according to the position of the remarkable characteristic point in each luminance value arrangement data. For example, the present exemplary embodiment, which captures an image of the yellow spot of the fundus, uses the fovea as the remarkable characteristic point.

In step S404, the three-dimensional shape combination unit 124 mutually associates the characteristic points, which is extracted in step S402, of the two pieces of luminance value arrangement data input in step S401 to generate a characteristic point pair.

If one characteristic point of a characteristic point pair can be uniquely identified from the other, the present exemplary embodiment can easily associate the characteristic points having the same identifier. On the other hand, if one characteristic point of a characteristic point pair cannot be uniquely identified from the other, then the present exemplary embodiment provisionally associates a characteristic point of one luminance value arrangement data, which is least distant from a characteristic point of the other luminance value arrangement data.

In step S405, the three-dimensional shape combination unit 124 executes displacement processing for displacing each characteristic point of each luminance value arrangement data.

More specifically, in step S405, the three-dimensional shape combination unit 124 calculates a parameter for controlling the displacement of a characteristic point according to the accuracy estimated value in the direction of three axes at the position of the characteristic point. In this processing, the three-dimensional shape combination unit 124 sets a displacement control parameter so that the characteristic point is hardly displaced in the direction in which the accuracy estimated value is great.

Suppose here that the mutually associated characteristic points are connected to one another by a spring and that adjacent characteristic points existing within the same luminance value arrangement data are also mutually connected by a spring. In this case, the parameter is equivalent to a spring constant.

A spring constant of the spring that connects mutually associated characteristic points may be set by using the following expression (3):

$$(P_x+P_y+P_z)/3 \qquad (3)$$

where "$P_x$", "$P_y$", and "$P_z$" denote a value of the accuracy in the direction of X-axis, Y-axis, and Z-axis, respectively.

In addition, a spring constant of the spring that connects characteristic points existing adjacent to one another may be set by using the following expression (4):

$$|aP_x+bP_y+cP_z|/\sqrt{a^2+b^2+c^2}^2 \qquad (4)$$

where each of "a", "b", and "c" denote a vector in the direction of connecting adjacent characteristic points.

By displacing the characteristic point by using a spring constant set in the above-described manner, the present exemplary embodiment can displace the characteristic points, so that the distance between the characteristic points can be reduced while maintaining information of a reliable shape.

The present exemplary embodiment calculates, by the loop calculation, a value of such a displacement that the root sum square of the distance between mutually associated characteristic points becomes as small as possible. More specifically, the three-dimensional shape combination unit 124 repeats the processing for sequentially updating the amount of displacement of each characteristic point to reduce the distance between positions of the mutually associated characteristic points to a smallest possible value.

If one characteristic point cannot be uniquely identified from the other, the three-dimensional shape combination unit 124 sequentially updates the association between the characteristic points according to the distance between the characteristic points during the loop calculation.

In step S406, the three-dimensional shape combination unit 124 executes processing for updating each luminance value arrangement data (three-dimensional shape data) by calculating a target position of transferring the luminance value included in each voxel except the characteristic point, of the two pieces of luminance value arrangement data (three-dimensional shape data) and updating the luminance value included in each voxel except the characteristic point.

More specifically, the three-dimensional shape combination unit 124 can calculate a target position of transferring the luminance value included in each voxel, by setting the characteristic point displaced in step S405 as a control point and by using the three-dimensional thin-plate spline (TPS) method discussed in Hagiwara, Hagiwara, Obata, "Morphing of Human Body for Segmentation based on 3-D Thin-Plate Spline", Institute of Electronics, Information and Communication Engineers (IEICE) Technical Report (MI2004-28), vol. 104, no. 163, pp. 1-6, 2004.

In step S407, the three-dimensional shape combination unit 124 executes processing for combining two pieces of luminance value arrangement data (three-dimensional shape data) into one piece of luminance value arrangement data whose luminance value has been updated in step S406.

More specifically, in step S407, the three-dimensional shape combination unit 124 combines luminance value arrangement data whose image quality has been improved compared with the image quality of each luminance value arrangement data before the combination by using a method discussed in J. F. Krucker, C. R. Meyer, G. L. LeCarpentier, J. B. Fowlkes, and P. L. Carson, "3D spatial compounding of ultrasound images using image-based nonrigid registration", Ultrasound Med. & Bio., Vol. 26, No. 9, pp. 1475-1488, 2000. In other words, the three-dimensional shape combination unit 124 sets an average value of the luminance values included in the associated voxels included in the two pieces of luminance value arrangement data as the luminance value of the luminance value arrangement data after combination.

In step S408, the three-dimensional shape combination unit 124 outputs the luminance value arrangement data (three-dimensional shape data) combined in step S407 to an external apparatus, or stores the same on the RAM 202 so that the combined luminance value arrangement data can be used from the other application.

As described above, by executing the processing in steps S401 through S408, the three-dimensional shape combination unit 124 combines two pieces of luminance value arrangement data (three-dimensional shape data) into one piece of luminance value arrangement data.

The three-dimensional shape data processing apparatus 120 according to the present exemplary embodiment deforms two pieces of three-dimensional shape data according to the accuracy in the direction of each of three axes (the shooting date and time difference). Accordingly, the present exemplary embodiment can correct deformation that may occur due to movement of the subject while maintaining information about the reliable shape.

As a result, the present exemplary embodiment can effectively correct distortion of three-dimensional shape data that may occur due to movement of the subject (object). In addition, as described above, the present exemplary embodiment combines position-aligned two pieces of three-dimensional shape data into one piece of three-dimensional shape data. Accordingly, the present exemplary embodiment can restore three-dimensional shape data whose image quality has improved from the image quality of three-dimensional shape data before combination.

Now, a second exemplary embodiment of the present invention will be described in detail below. A three-dimensional shape data processing apparatus (a three-dimensional shape data restoration apparatus) according to the present exemplary embodiment restores three-dimensional shape data based on data of a surface model (surface shape model), which is generated based on luminance value arrangement data.

The above-described first exemplary embodiment combines two pieces of luminance value arrangement data into one piece of luminance value arrangement data based on the association between characteristic points of the two pieces of luminance value arrangement data. The present exemplary embodiment combines two pieces of surface model data, which is generated based on two pieces of luminance value arrangement data, into one piece of surface model data without mutually associating characteristic points.

In the following description, the three-dimensional shape data processing apparatus and a three-dimensional shape data processing method according to the present exemplary embodiment will be described for points different from the first exemplary embodiment only.

The configuration of the three-dimensional shape data processing apparatus according to the present exemplary embodiment is similar to the three-dimensional shape data processing apparatus 120 (FIGS. 1 and 2) except the function of the three-dimensional shape combination unit 124 illustrated in FIG. 1. More specifically, in the present exemplary embodiment, the content of processing in step S104 illustrated in FIG. 3 is different from that described above with reference to FIG. 6 in the first exemplary embodiment.

Figure 7:
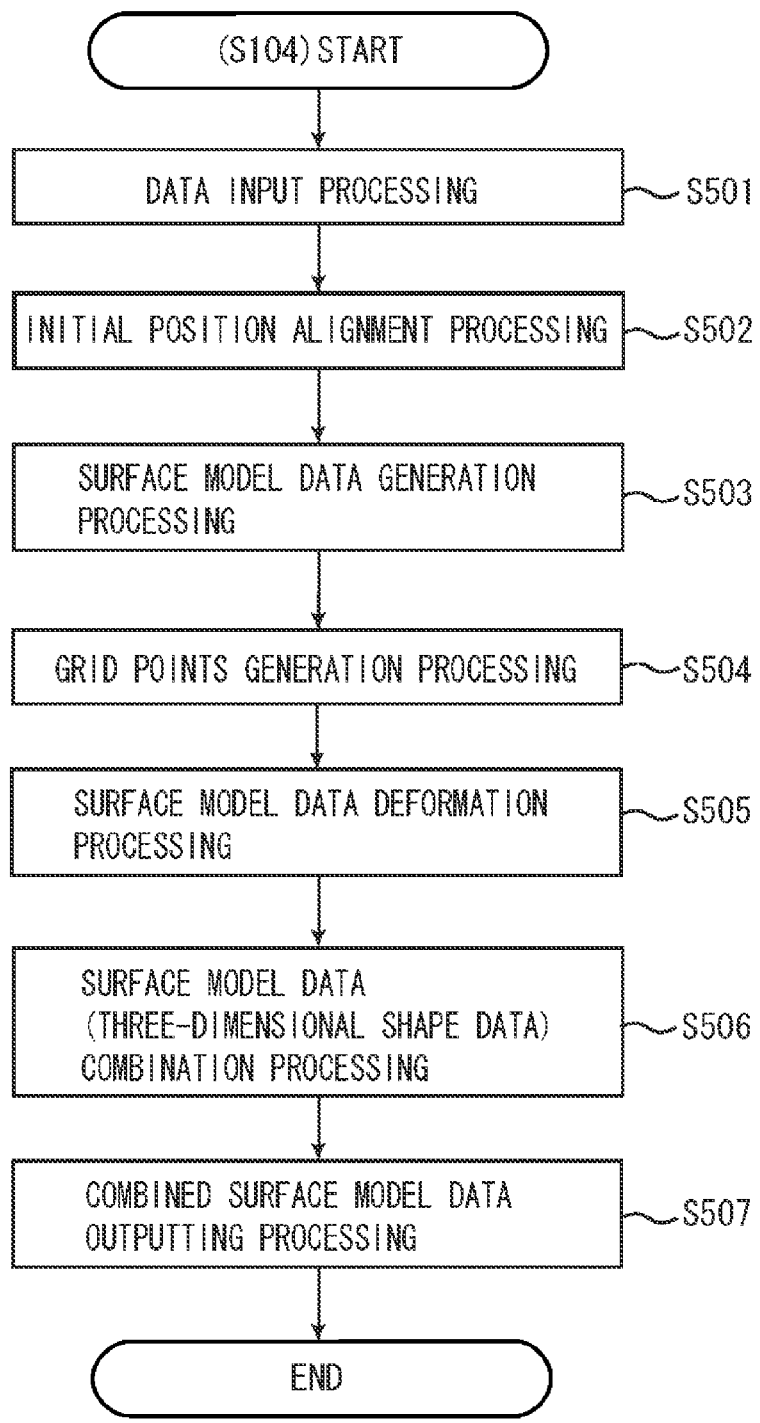
FIG. 7 is a flow chart illustrating an exemplary flow of three-dimensional shape data combination processing executed in step S104 in FIG. 3 according to a second exemplary embodiment of the present invention.

FIG. 7 is a flow chart illustrating an exemplary flow of three-dimensional shape data combination processing in step S104 in FIG. 3 according to the present exemplary embodiment. The processing in the flow chart of FIG. 7 is implemented by the CPU 201 by executing a program that can implement the function of the three-dimensional shape combination unit 124 according to the present exemplary embodiment.

It is supposed that the program code that can implement the processing in the flow chart of FIG. 7 has already been loaded from the ROM 203 or the external storage device 207 onto the RAM 202 before starting the processing illustrated in FIG. 7.

Referring to FIG. 7, in step S501, the three-dimensional shape combination unit 124 inputs the data output by the three-dimensional shape restoration unit 122 and the accuracy estimation unit 123. More specifically, the three-dimensional shape combination unit 124 inputs, from the three-dimensional shape restoration unit 122, two pieces of luminance value arrangement data including luminance value stored in each voxel.

In addition, the three-dimensional shape combination unit 124 inputs, from the accuracy estimation unit 123, two pieces of accuracy arrangement data including accuracy estimated value in the direction of each of three axes stored in each voxel.

In step S502, supposing that no distortion has occurred on the two pieces of luminance value arrangement data input in step S501, the three-dimensional shape combination unit 124 executes initial position alignment processing for roughly aligning the initial positions of the two pieces of luminance value arrangement data.

More specifically, in step S502, the three-dimensional shape combination unit 124 roughly aligns the initial positions of the two pieces of luminance value arrangement data by calculating rigid body conversion between the two pieces of luminance value arrangement data by using a mutual information content maximization method discussed in W. M. Wells III, P. Viola, H. Atsumi, S. Nakajima, and R. Kikinis, "Multi-modal volume registration by maximization of mutual information", Medical Image Analysis, vol. 1, no. 1, pp. 35-51, 1996.

In step S503, the three-dimensional shape combination unit 124 generates surface model data based on each of the two pieces of luminance value arrangement data. In other words, the three-dimensional shape combination unit 124 generates data of a first surface model (data of a first surface shape model) based on the first luminance value arrangement data and also generates data of a second surface model (data of a second surface shape model) based on the second luminance value arrangement data.

More specifically, in step S503, the three-dimensional shape combination unit 124 extracts a target portion within the subject by using the graph cut method discussed in Y. Boykov and M-P. Jolly, "Interactive graph cuts for optimal boundary & region segmentation of objects in N-D images", Proc. ICCV2001, vol. I, pp. 105-112, 2001. Furthermore, the three-dimensional shape combination unit 124 generates a triangle patch having its vertexes on voxels existing on the surface of the target portion of the subject. In addition, the three-dimensional shape combination unit 124 uses an aggregate of the triangle patches as the surface model data.

In step S504, the three-dimensional shape combination unit 124 generates grid point groups. Furthermore, the three-dimensional shape combination unit 124 executes processing for surrounding each surface model data with a cuboid including arranged grid point groups.

In step S505, the three-dimensional shape combination unit 124 executes processing for deforming each surface model data by displacing the grid point groups by using a deformation method, such as Free-form deformation (FFD) discussed in T. W. Sederberg, "Free-form deformation of solid geometric models", Proc. SIGGRAPH '86, vol. 20, no. 4, pp. 151-160, 1986, for example.

In other words, in step S505, the three-dimensional shape combination unit 124 calculates a parameter for controlling the displacement of a grid based on the accuracy estimated value in the direction of three axes at the position of the grid. In this processing, the three-dimensional shape combination unit 124 sets a displacement control parameter so that the grid is hardly displaced in the direction in which the accuracy estimated value is great.

More specifically, in step S505, in combining the first surface model data and the second surface model data together, the three-dimensional shape combination unit 124 executes processing for deforming the data so that the surface shape of each surface model data is substantially similar to each other based on an accuracy estimated value.

Suppose here that adjacent grid points are mutually connected by a spring. In this case, the parameter is equivalent to a spring constant. Accordingly, the three-dimensional shape combination unit 124 can deform surface model data while maintaining information about the reliable shape by displacing the grid points according to the rigidity (the accuracy) of the spring in the direction of the three axes.

In the present exemplary embodiment, the three-dimensional shape combination unit 124 calculates, by loop calculation, displacement by which the distance between each of the vertexes of the triangle patch included in one surface model data and the surface of the other surface model data becomes as small as possible.

More specifically, the three-dimensional shape combination unit 124 repeats processing for sequentially updating the amount of displacement of the position of each grid point, which surrounds each surface model data, so that the shape of the two surface models may become as similar as possible.

In step S506, the three-dimensional shape combination unit 124 executes processing for combining two pieces of surface model data (three-dimensional shape data), which have been deformed in step S505, into one piece of surface model data.

In other words, in step S506, the three-dimensional shape combination unit 124 generates surface model data having a smoothly curved surface by stitching on an overlapping portion of the two pieces of surface models by using a method discussed in G. Turk and M. Levoy, "Zippered polygon meshes from range images", Proc. SIGGRAPH '94, pp. 311-318, 1994.

In step S507, the three-dimensional shape combination unit 124 outputs the surface model data (three-dimensional shape data) combined in step S407 to an external apparatus, or stores the same on the RAM 202 so that the combined surface model data can be used from the other application.

As described above, by executing the processing in steps S501 through S507, the three-dimensional shape combination unit 124 combines two pieces of surface model data (three-dimensional shape data) into one piece of surface model data.

The three-dimensional shape data processing apparatus 120 according to the present exemplary embodiment deforms two pieces of three-dimensional shape data according to the accuracy in the direction of each of three axes (the shooting date and time difference). Accordingly, the present exemplary embodiment can correct deformation that may occur due to movement of the subject while maintaining information about the reliable shape. As a result, the present exemplary embodiment can effectively correct distortion of three-dimensional shape data that may occur due to movement of the subject (object).

In addition, as described above, the present exemplary embodiment combines position-aligned two pieces of three-dimensional shape data into one piece of three-dimensional shape data. Accordingly, the present exemplary embodiment can restore three-dimensional shape data whose image quality has improved from the image quality of three-dimensional shape data before combination.

Now, a third exemplary embodiment of the present invention will be described in detail below. A three-dimensional shape data processing apparatus (a three-dimensional shape data restoration apparatus) according to the present exemplary embodiment restores three-dimensional shape data based on luminance value arrangement data, similar to the first exemplary embodiment.

The above-described first exemplary embodiment combines two pieces of luminance value arrangement data into one piece of luminance value arrangement data according to the association between characteristic points of the two pieces of luminance value arrangement data. The present exemplary embodiment combines two pieces of luminance value arrangement data into one piece of luminance value arrangement data without mutually associating characteristic points, similar to the above-described second exemplary embodiment.

In the following description, the three-dimensional shape data processing apparatus and a three-dimensional shape data processing method according to the present exemplary embodiment will be described about points different from the first exemplary embodiment only.

The configuration of the three-dimensional shape data processing apparatus according to the present exemplary embodiment is similar to the three-dimensional shape data processing apparatus 120 illustrated in FIGS. 1 and 2 except the function of the three-dimensional shape combination unit 124 illustrated in FIG. 1. More specifically, in the present exemplary embodiment, the content of processing in step S104 illustrated in FIG. 3 is different from that described above with reference to FIG. 6 in the first exemplary embodiment.

Figure 8:
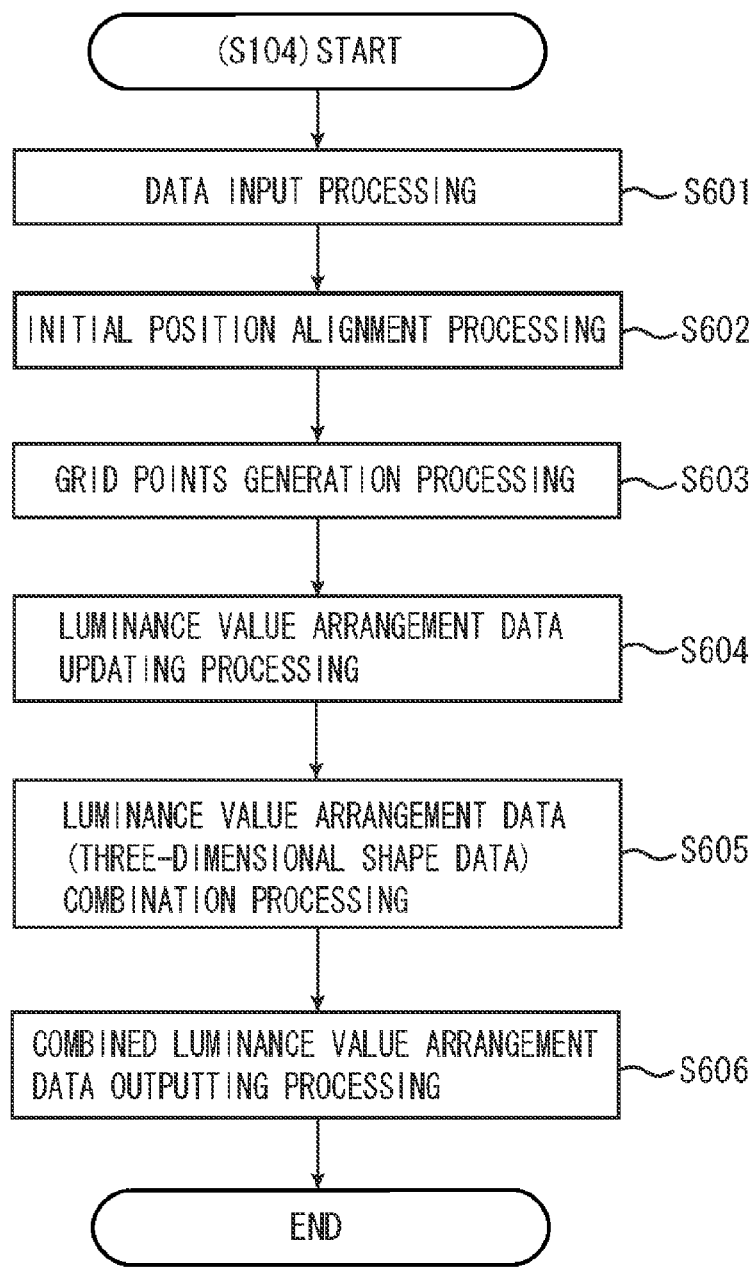
FIG. 8 is a flow chart illustrating an exemplary flow of three-dimensional shape data combination processing in step S104 in FIG. 3 according to a third exemplary embodiment of the present invention.
Figure 9:
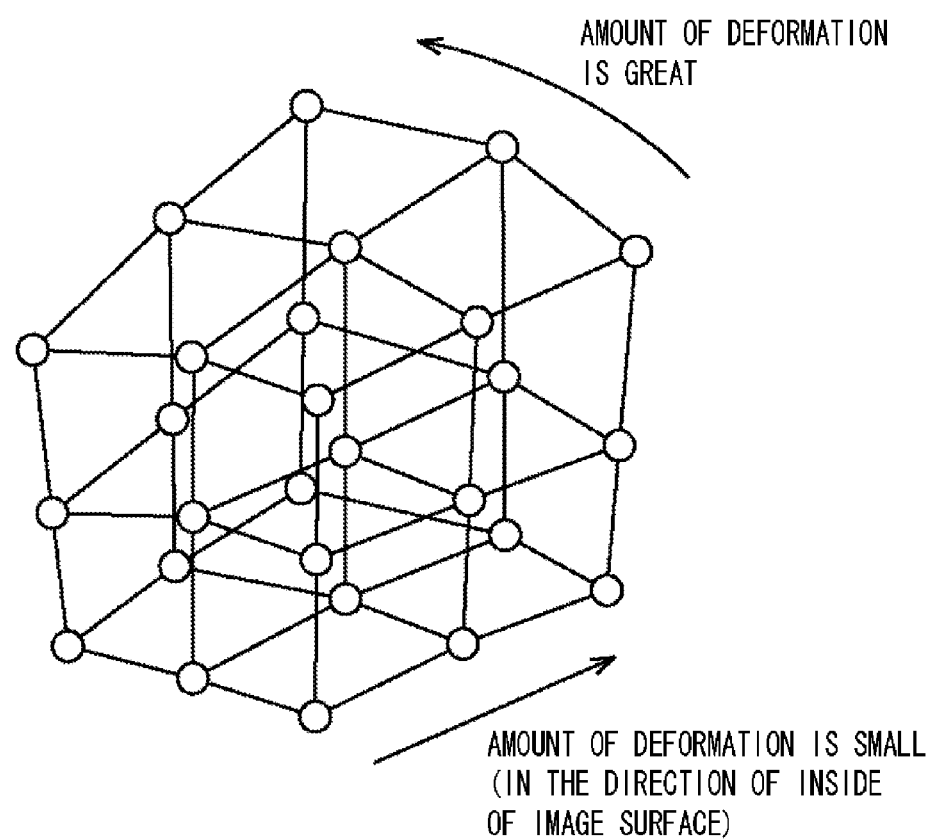
FIG. 9 illustrates an example of distortion that may occur on restored three-dimensional shape data in a conventional method.

FIG. 8 is a flow chart illustrating an exemplary flow of three-dimensional shape data combination processing in step S104 in FIG. 3 according to the present exemplary embodiment.

The processing in the flow chart of FIG. 8 is implemented by the CPU 201 by executing a program for implementing the function of the three-dimensional shape combination unit 124 according to the present exemplary embodiment. It is supposed that the program code for implementing the processing in the flow chart of FIG. 8 has already been loaded from the ROM 203 or the external storage device 207 onto the RAM 202 before starting the processing illustrated in FIG. 8.

Referring to FIG. 8, in step S601, the three-dimensional shape combination unit 124 inputs the data output by the three-dimensional shape restoration unit 122 and the accuracy estimation unit 123. More specifically, the three-dimensional shape combination unit 124 inputs, from the three-dimensional shape restoration unit 122, two pieces of luminance value arrangement data including luminance value stored in each voxel.

In addition, the three-dimensional shape combination unit 124 inputs, from the accuracy estimation unit 123, two pieces of accuracy arrangement data including accuracy estimated value in the direction of each of three axes stored in each voxel.

In step S602, supposing that no distortion has occurred on the two pieces of luminance value arrangement data input in step S601, the three-dimensional shape combination unit 124 executes initial position alignment processing for roughly aligning the initial positions of the two pieces of luminance value arrangement data.

More specifically, in step S602, the three-dimensional shape combination unit 124 roughly aligns the initial positions of the two pieces of luminance value arrangement data by calculating rigid body conversion between the two pieces of luminance value arrangement data by using a mutual information content maximization method discussed in W. M. Wells III, P. Viola, H. Atsumi, S. Nakajima, and R. Kikinis, "Multi-modal volume registration by maximization of mutual information", Medical Image Analysis, vol. 1, no. 1, pp. 35-51, 1996.

In step S603, the three-dimensional shape combination unit 124 generates grid point groups. Furthermore, the three-dimensional shape combination unit 124 executes processing for surrounding each luminance value arrangement data with a cuboid including arranged grid point groups. In this processing, the three-dimensional shape combination unit 124 uses the center of each voxel of the luminance value arrangement data as the grid point.

In step S604, by deforming each surface model data by displacing the grid point groups by using a deformation method, such as Free-form deformation (FFD) discussed in T. W. Sederberg, "Free-form deformation of solid geometric models", Proc. SIGGRAPH '86, vol. 20, no. 4, pp. 151-160, 1986, for example, the three-dimensional shape combination unit 124 transfers the luminance value stored in each voxel so that the luminance value corresponds to the displaced grid point. In addition, the three-dimensional shape combination unit 124 executes processing for updating each luminance value arrangement data (three-dimensional shape data) for updating the luminance value.

In other words, in step S604, the three-dimensional shape combination unit 124 calculates a parameter for controlling the displacement of a grid according to the accuracy estimated value in the direction of three axes at the position of the grid. In this processing, the three-dimensional shape combination unit 124 sets a displacement control parameter so that the grid is hardly displaced in the direction in which the accuracy estimated value is great.

Suppose here that adjacent grid points are mutually connected by a spring. In this case, the parameter is equivalent to a spring constant. Accordingly, the three-dimensional shape combination unit 124 can update the luminance value stored in each voxel included in the luminance value arrangement data while maintaining information about the reliable shape by displacing the grid points according to the rigidity (the accuracy) of the spring in the direction of the three axes.

In the present exemplary embodiment, the three-dimensional shape combination unit 124 calculates, by loop calculation, displacement of grid points by which the luminance value stored in each voxel included in the two pieces of luminance value arrangement data becomes as similar to each other as possible. More specifically, the three-dimensional shape combination unit 124 repeats processing for sequentially updating the amount of displacement of the position of each grid point, which surrounds each luminance value arrangement data, so that the two pieces of luminance value arrangement data may become as similar to each other as possible.

In step S605, the three-dimensional shape combination unit 124 executes processing for combining two pieces of luminance value arrangement data (three-dimensional shape data), whose luminance values have been updated in step S603, into one piece of luminance value arrangement data.

More specifically, in step S605, the three-dimensional shape combination unit 124 combines luminance value arrangement data whose image quality has been improved compared with the image quality of each luminance value arrangement data before the combination by using a method discussed in J. F. Krucker, C. R. Meyer, G. L. LeCarpentier, J. B. Fowlkes, and P. L. Carson, "3D spatial compounding of ultrasound images using image-based nonrigid registration", Ultrasound Med. & Bio., Vol. 26, No. 9, pp. 1475-1488, 2000. In other words, the three-dimensional shape combination unit 124 sets an average value of the luminance values included in the associated voxels included in the two pieces of luminance value arrangement data as the luminance value of the luminance value arrangement data after combination.

In step S606, the three-dimensional shape combination unit 124 outputs the luminance value arrangement data (three-dimensional shape data) combined in step S605 to an external apparatus, or stores the same on the RAM 202 so that the combined luminance value arrangement data can be used from the other application.

As described above, by executing the processing in steps S601 through S606, the three-dimensional shape combination unit 124 combines two pieces of luminance value arrangement data (three-dimensional shape data) into one piece of luminance value arrangement data.

The three-dimensional shape data processing apparatus 120 according to the present exemplary embodiment deforms two pieces of three-dimensional shape data according to the accuracy in the direction of each of three axes (the shooting date and time difference). Accordingly, the present exemplary embodiment can correct deformation that may occur due to movement of the subject while maintaining information about the reliable shape. As a result, the present exemplary embodiment can effectively correct distortion of three-dimensional shape data that may occur due to movement of the subject (object).

In addition, as described above, the present exemplary embodiment combines position-aligned two pieces of three-dimensional shape data into one piece of three-dimensional shape data. Accordingly, the present exemplary embodiment can restore three-dimensional shape data whose image quality has improved from the image quality of three-dimensional shape data before combination.

In each of the above-described exemplary embodiments, an apparatus including an OCT is used as the modality 110. However, the modality 110 configured to capture tomographic images is not limited to this. More specifically, it is also useful if an ultrasonic image diagnostic apparatus, an MRI, or an X-ray computed tomographic imaging apparatus (an X-ray CT) is used.

Regardless of the type of modality used as the modality 110, the modality 110 acquires two tomographic image groups by capturing a plurality of tomographic images of a subject (object) twice and implements the method according to each of the above-described exemplary embodiments.

Furthermore, the modality 110 captures tomographic images so that the direction of the normal line to each of the tomographic images captured in a first image taking operation differs from the direction of the normal line to each of the tomographic images captured in a second image taking operation by approximately 90 degrees. In this case, the directions of image capturing in the two image capturing operations (the directions of the image capturing unit of the modality 110) in relation to the subject are either the same as or different from each other.

In the present invention, if an ultrasonic image diagnostic apparatus is used as the modality 110, the configuration thereof is slightly different from that of the modality 110 according to each of the above-described exemplary embodiments. More specifically, as described above in the description of the related art, a doctor or a medical technician usually captures a tomographic image of a lesion by freely moving a probe by hand. Therefore, in this case, information about the position of the captured tomographic image within the body of the subject is not acquired.

In order to address the above-described problem, a position and attitude sensor (not illustrated) mounted on the modality 110 measures the position and orientation of the probe. For the position and attitude sensor, FASTRAK of Polhemus (a U.S. sensor manufacturer) can be used.

In the present exemplary embodiment, the configuration of the position and attitude sensor is not limited to a specific configuration if the position and orientation sensor is capable of measuring the position and orientation of a probe. Data of the position and orientation of the probe measured by the sensor is input to the three-dimensional shape data processing apparatus 120 via the data input unit 121.

The data of the position and orientation measured by the position and attitude sensor includes an error due to an affect, such as distortion of the magnetic field. More specifically, displacement (positional deviation) between tomographic images may occur not only due to movement of the subject during an operation for taking the tomographic images but also due to the measurement error in the position and orientation of each tomographic image.

In order to address the above-described problem, the present exemplary embodiment modifies the processing in step S306 in FIG. 5 as follows.

More specifically, in the present exemplary embodiment, in step S306, the accuracy estimation unit 123 calculates an estimated value of the accuracy of all voxels in the direction of three axes of three-dimensional shape data to be restored. More specifically, supposing that no error has occurred during measurement by the position and attitude sensor, the accuracy estimation unit 123 calculates an accuracy P in the three axes by the method in step S306 in the above-described first exemplary embodiment.

Then, supposing that the subject does not move during the measurement, the accuracy estimation unit 123 calculates an accuracy Q in the direction of three axes based on a distribution of errors of the position and attitude sensor, which is previously measured. Furthermore, the accuracy estimation unit 123 executes multiplication of components of the calculated accuracy P and Q in the three axes to calculate accuracy estimated values in the direction of each of the three axes, considering the movement of the subject and the error occurring on the sensor.

As described above, regardless of the type of the modality 110, which is capable of taking tomographic image groups, the present exemplary embodiment can implement the above-described method according to each of the above-described exemplary embodiments.

In each of the above-described exemplary embodiments, two tomographic image groups are input. However, the number of tomographic image groups to be processed is not limited to two. More specifically, the method according to each of the above-described exemplary embodiment can be implemented if three or more tomographic image groups are input.

In each of the above-described exemplary embodiments, a voxel storing a luminance value and a voxel storing an accuracy estimated value are generated separately from each other. However, the present invention is not limited to this. More specifically, it is also useful if a voxel that stores both the luminance value and the accuracy estimated value is generated. As described above, each exemplary embodiment of the present invention having the above-described configuration can restore three-dimensional shape data having a high image quality and on which little distortion may occur.

Each of the units and components of the three-dimensional shape data processing apparatus 120 according to each of the above-described exemplary embodiments and processing in each step of the flow of the three-dimensional shape data processing method illustrated in FIGS. 3 through 8 can be implemented by the CPU 201 of a computer by executing a program stored on the ROM 203. The program and a computer-readable recording medium (storage medium) that records the program are included within the scope of the present invention.

The present invention can be implemented in a system, an apparatus, a method, a program, or a storage medium storing the program, for example. More specifically, the present invention can be applied to a system including a plurality of devices and to an apparatus that includes one device.

The present invention can be implemented by directly or remotely supplying a program of software implementing functions of the above-described exemplary embodiments (in the exemplary embodiments, the program corresponding to the processing executed according to the flow charts in FIGS. 3 through 8) to a system or an apparatus, and reading and executing supplied program codes with the system or a computer of the apparatus.

Accordingly, the program code itself, which is installed to the computer for implementing the functional processing of the present invention with the computer, implements the present invention. In other words, the present invention also includes the computer program implementing the functional processing of the present invention.

Accordingly, the program can be configured in any form, such as object code, a program executed by an interpreter, and script data supplied to an OS.

As the recording medium for supplying such program code, a floppy disk, a hard disk, an optical disk, a magneto-optical disk (MO), a CD-ROM, a CD-recordable (CD-R), a CD-rewritable (CD-RW), a magnetic tape, a nonvolatile memory card, a ROM, and a digital versatile disk (DVD) (a DVD-ROM and a DVD-recordable (DVD-R)), for example, can be used.

The above program can also be supplied by connecting to a web site on the Internet by using a browser of a client computer and by downloading the program from the web site to a recording medium such as a hard disk. In addition, the above program can also be supplied by downloading a compressed file that includes an automatic installation function from the web site to a recording medium such as a hard disk.

The functions of the above embodiments can also be implemented by dividing the program code into a plurality of files and downloading each divided file from different web sites. That is, a World Wide Web (WWW) server for allowing a plurality of users to download the program file for implementing the functional processing configures the present invention.

In addition, the above program can also be supplied by distributing a storage medium such as a CD-ROM and the like which stores the program according to the present invention after an encryption thereof; by allowing the user who is qualified for a prescribed condition to download key information for decoding the encryption from the web site via the Internet; and by executing and installing in the computer the encrypted program code by using the key information.

Furthermore, the functions according to the embodiments described above can be implemented not only by executing the program code read by the computer, but also implemented by the processing in which an OS or the like carries out a part of or the whole of the actual processing based on an instruction given by the program code.

Further, in another aspect of the embodiment of the present invention, after the program code read from the recording medium is written in a memory provided in a function expansion board inserted in a computer or a function expansion unit connected to the computer, a CPU and the like provided in the function expansion board or the function expansion unit carries out apart of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-334265 filed Dec. 26, 2008, which is hereby incorporated by reference herein in its entirety.

What is claimed is:

1. A three-dimensional data processing apparatus comprising:
 a data input unit configured to input data of a first tomographic image group including a plurality of tomographic images and data of a second tomographic image group including a plurality of tomographic images, wherein at least a part of an image capturing area of the second tomographic image group is overlapped with at least a part of an image capturing area of the first tomographic image group;
 an estimation unit configured to estimate accuracy values at each of a plurality of points related to the first tomographic image group and the second tomographic image group, based on a first direction of at least a part of the tomographic images included in the first tomographic image group and a second direction of at least a part of the tomographic images included in the second tomographic image group, wherein the first direction differs from the second direction; and
 a combination unit configured to combine the first tomographic image group and the second tomographic image group into one piece of three-dimensional data based on the accuracy values estimated by the estimation unit.

2. The three-dimensional data processing apparatus according to claim 1, wherein the first three-dimensional data and second three-dimensional data is volume data.

3. The three-dimensional data processing apparatus according to claim 1, wherein the combination unit is configured to extract a characteristic point from the first three-dimensional data and the second three-dimensional data, and execute the combination processing according to association between the extracted characteristic points.

4. The three-dimensional data processing apparatus according to claim 1,
 wherein the restoration unit is configured to restore first luminance value arrangement data as the first three-dimensional data and second luminance value arrangement data as the second three-dimensional data,
 wherein the estimation unit is configured to estimate accuracy values at each of a plurality of points inside the first and second luminance value arrangement data, and
 wherein the combination unit is configured to generate data of a first surface shape model based on the first luminance value arrangement data, generate data of a second surface shape model based on the second luminance value arrangement data, and combine the data of the first and second surface shape models based on the estimated accuracy values to generate one piece of surface shape model data corresponding to the one piece of three-dimensional data.

5. The three-dimensional data processing apparatus according to claim 4, wherein the combination unit is configured, in combining the data of the first and second surface shape models, to deform each of surface shape model data so that a shape of a surface of the first and second surface shape model data becomes substantially the same as each other based on the estimated accuracy values, and combine the deformed surface shape model data into one piece of surface shape model data.

6. The three-dimensional data processing apparatus according to claim 1, wherein the estimation unit is configured to estimate the accuracy values based on capturing time difference between adjacent pixels of each of the plurality of tomographic images, and a measurement error that occurs in measuring a position and orientation of each of the tomographic images.

7. The three-dimensional data processing apparatus according to claim 1, wherein the data of the first and second tomographic image groups are acquired by an optical coherence tomography.

8. The three-dimensional data processing apparatus according to claim 1, wherein the data of the first and second tomographic image groups are acquired by an ultrasonic image diagnostic apparatus.

9. The three-dimensional data processing apparatus according to claim 1, wherein a normal direction of at least a part of the first tomographic image group is different from a normal direction of at least a part of the second tomographic image group by an angle of approximately 90 degrees.

10. A three-dimensional data processing method comprising:
 inputting data of a first tomographic image group including a plurality of tomographic images and data of a second tomographic image group including a plurality of tomographic images, wherein at least a part of an image capturing area of the second tomographic image group is overlapped with at least a part of an image capturing area of the first tomographic image group;
 estimating accuracy values at each of a plurality of points related to the first tomographic image group and the second tomographic image group, based on a first direction of at least a part of the tomographic images included in the first tomographic image group and a second direction of at least a part of the tomographic images included in the second tomographic image group, wherein the first direction differs from the second direction; and
 combining the first tomographic image group and the second tomographic image group into one piece of three-dimensional data based on the accuracy values estimated by the estimation step.

11. A computer-readable storage medium storing computer-executable instructions which, when executed by a computer, cause the computer to perform three-dimensional data processing operations comprising:
 inputting data of a first tomographic image group including a plurality of tomographic images and data of a second tomographic image group including a plurality of tomographic images, wherein at least a part of an image taking area of the second tomographic image group is overlapped with at least a part of an image taking area of the first tomographic image groups;
 estimating accuracy values at each of a plurality of points related to the first tomographic image group and the second tomographic image group, based on a first direction of at least a part of the tomographic images included in the first tomographic image group and a second direction of at least a part of the tomographic images included in the second tomographic image group, wherein the first direction differs from the second direction; and combining the first tomographic image group and the second tomographic image group into one piece of three-dimensional data based on the accuracy values estimated by the estimation step.

12. A three-dimensional data processing apparatus comprising:
a data input unit configured to input data of a first image group including a plurality of tomographic images and data of a second image group including a plurality of tomographic images, wherein at least a part of an image capturing area of the second image group is overlapped with at least a part of an image capturing area of the first image group;
an estimation unit configured to estimate accuracy values at each of a plurality of points related to the first image group and the second image group, based on a first direction of at least a part of the images included in the first image group and a second direction of at least a part of the images included in the second image group, wherein the first direction differs from the second direction; and
a combination unit configured to combine the first image group and the second image group into one piece of three-dimensional data based on the accuracy values estimated by the estimation unit.

13. A three-dimensional data processing apparatus comprising:
a data input unit configured to input data of a first tomographic image group including a plurality of tomographic images and data of a second tomographic image group including a plurality of tomographic images, wherein at least a part of an image capturing area of the second tomographic image group is overlapped with at least a part of an image capturing area of the first tomographic image group, and wherein first direction of at least a part of the tomographic images included in the first tomographic image group differs from second direction of at least a part of the tomographic images included in the second tomographic image group;
an estimation unit configured to estimate accuracy values at each of a plurality of points related to the first image group and second image group; and
a combination unit configured to combine the first tomographic image group and the second tomographic image group into one piece of three-dimensional data based on the accuracy values estimated by the estimation unit.

14. A three-dimensional data processing method comprising:
inputting data of a first tomographic image group including a plurality of tomographic images and data of a second tomographic image group including a plurality of tomographic images, wherein at least a part of an image capturing area of the second tomographic image group is overlapped with at least a part of an image capturing area of the first tomographic image group, and wherein first direction of at least a part of the tomographic images included in the first tomographic image group differs from second direction of at least a part of the tomographic images included in the second tomographic image group;
estimating accuracy values at each of a plurality of points related to the first image group and second image group; and
combining the first tomographic image group and the second tomographic image group into one piece of three-dimensional data based on the accuracy values estimated by the estimating step.

15. A computer-readable storage medium storing computer-executable instructions which, when executed by a computer, cause the computer to perform three-dimensional data processing operations comprising:
inputting data of a first tomographic image group including a plurality of tomographic images and data of a second tomographic image group including a plurality of tomographic images, wherein at least a part of an image capturing area of the second tomographic image group is overlapped with at least a part of an image capturing area of the first tomographic image group, and wherein first direction of at least a part of the tomographic images included in the first tomographic image group differs from second direction of at least a part of the tomographic images included in the second tomographic image group;
estimating accuracy values at each of a plurality of points related to the first image group and second image group; and
combining the first tomographic image group and the second tomographic image group into one piece of three-dimensional data based on the accuracy values estimated by the estimating step.

* * * * *